(12) United States Patent
Kamiya

(10) Patent No.: US 11,984,585 B2
(45) Date of Patent: May 14, 2024

(54) ALL SOLID STATE BATTERY

(71) Applicant: Toyota Jidosha Kabushiki Kaisha, Toyota (JP)

(72) Inventor: Masato Kamiya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 202 days.

(21) Appl. No.: 17/535,190

(22) Filed: Nov. 24, 2021

(65) Prior Publication Data

US 2022/0181609 A1 Jun. 9, 2022

(30) Foreign Application Priority Data

Dec. 3, 2020 (JP) .................................. 2020-201092

(51) Int. Cl.
| | |
|---|---|
| *H01M 4/36* | (2006.01) |
| *H01M 4/02* | (2006.01) |
| *H01M 4/38* | (2006.01) |
| *H01M 4/66* | (2006.01) |
| *H01M 10/0525* | (2010.01) |
| *H01M 10/0562* | (2010.01) |

(52) U.S. Cl.
CPC .......... *H01M 4/366* (2013.01); *H01M 4/386* (2013.01); *H01M 4/661* (2013.01); *H01M 10/0525* (2013.01); *H01M 10/0562* (2013.01); H01M 2004/027 (2013.01); H01M 2220/20 (2013.01)

(58) Field of Classification Search
None
See application file for complete search history.

(56) References Cited

U.S. PATENT DOCUMENTS 11,075,366 B2 7/2021 Senoue
2021/0036362 A1* 2/2021 Ueno .................. H01M 10/052

FOREIGN PATENT DOCUMENTS

| JP | 2019-106352 A | 6/2019 | |
|---|---|---|---|
| WO | 2014/141962 A1 | 9/2014 | |
| WO | WO-2014141962 A1 * | 9/2014 | ............... H01B 1/06 |
| WO | 2019/189311 A1 | 10/2019 | |
| WO | WO-2019189311 A1 * | 10/2019 | ........ H01M 10/0525 |

OTHER PUBLICATIONS

WO2014141962—machine translation (Year: 2014).*

* cited by examiner

*Primary Examiner* — Jonathan G Leong
*Assistant Examiner* — Aryana Y. Ortiz
(74) *Attorney, Agent, or Firm* — Dinsmore & Shohl LLP

(57) ABSTRACT

An all solid state battery includes a cathode, an anode, an opposing region, a non-opposing region, and a solid electrolyte layer, and an anode active material layer includes an anode active material, and a sulfide solid electrolyte, the anode current collector is a current collector that react with the sulfide solid electrolyte at an open circuit potential of the anode active material, the anode current collector includes a coating layer including lithium titanate, on a surface of the anode active material layer side, in plan view, the coating layer includes one or two or more of an existence portion and non-existence portion respectively, in the region specified by an outer edge of the anode current collector, and in plan view, the coating layer includes the existence portion in at least a part of the opposing region, and includes the non-existence portion in at least a part of the non-opposing region.

15 Claims, 4 Drawing Sheets

ALL SOLID STATE BATTERY

CROSS-REFERENCE TO RELATED APPLICATIONS

This application is based upon and claims the benefit of priority of the prior Japanese Patent Application No. 2020-201092, filed on Dec. 3, 2020, the entire contents of which are incorporated herein by reference.

TECHNICAL FIELD

The present disclosure relates to an all solid state battery.

BACKGROUND ART

An all solid state battery is a battery including a solid electrolyte layer between a cathode active material layer and an anode active material layer, and has advantages in that it is easy to simplify a safety device as compared with a liquid battery including a liquid electrolyte containing flammable organic solvents.

As an anode active material having good capacity property, a Si based active material has been known. Also, as a solid electrolyte having good ion conductivity, a sulfide solid electrolyte has been known. Patent Literature 1 discloses a method for producing a sulfide solid battery, the method comprising a step of obtaining a predoped material by doping a black lead or a lithium titanate with lithium; a step of obtaining an anode mixture by mixing a sulfide solid electrolyte, a silicon based active material, and the predoped material; a step of obtaining an anode by stacking the anode mixture on the surface of a cathode current collector including copper.

CITATION LIST

Patent Literature

Patent Literature 1: Japanese Patent Application Laid-Open (JP-A) No. 2019-106352

SUMMARY OF DISCLOSURE

Technical Problem

As disclosed in Patent Literature 1, since the potential of the silicon based active material before charging is high, the sulfide solid electrolyte included in the anode active material layer and the anode current collector (such as a Cu foil) react with each other to generate a metal sulfide (such as CuS) having high electron conductivity. The metal sulfide may be a cause of a minute short circuit (voltage drop), by being diffused.

Meanwhile, the size of the anode in plan view is made larger than the size of the cathode in some cases. By providing a difference in sizes, the occurrence of a short circuit due to the contact between the cathode and the anode, during the production of the all solid state battery (such as at the time of shape forming by cutting an electrode), may be suppressed. Also, by making the size of the anode relatively large, the occurrence points of Li dendrite may be scattered.

When the size of the anode is made larger than the size of the cathode, the charge/discharge reaction in the anode active material layer tends to be uneven. Here, in a thickness direction of the all solid state battery, a region where the anode active material layer and the cathode active material layer are opposing to each other is regarded as an opposing region; and a region where the anode active material layer and the cathode active material layer are not opposing to each other is regarded as a non-opposing region. In the opposing region, since the ion conductive distance and the electron conductive distance in the anode active material layer are the shortest, the potential of the anode active material tends to be decrease by charging. Meanwhile, in the non-opposing region, since the ion conductive distance and the electron conductive distance in the anode active material layer are longer than that in the opposing region, the potential of the anode active material is hardly decreased by charging. Therefore, in the anode active material layer located in the non-opposing region, the minute short circuit described above tends to occur.

The present disclosure has been made in view of the above circumstances, and a main object of the present disclosure is to provide an all solid state battery wherein the occurrence of a minute short circuit, in an anode active material layer located in a non-opposing region, is suppressed.

Solution to Problem

In order to achieve the object, the present inventor has carried out extensive studies, and found out that, by being creative with a coat layer (a coat layer including lithium titanate) provided on a surface of an anode current collector, uniformity of a charge/discharge reaction in an anode active material layer may be improved. Here, the lithium titanate included in the coat layer (particularly $Li_4Ti_5O_{12}$) has an electron conductivity in the charged state. However, it is insulated when Li is extracted at occurrence of an inner short circuit, for example. By placing the coat layer having such a shutdown function between the anode active material layer and the anode current collector, improvement in safety may be expected.

Meanwhile, by placing the coating layer, the resistance itself increases. Thus, it has been found out that, by not placing the coating layer in the non-opposing region while placing the coating layer in the opposing region, the resistance difference between the opposing region and the non-opposing region decreases, so that a charge reaction may be progressed (the potential of the anode active material may be decreased) in the anode active material layer located in the non-opposing region. The present disclosure has been made based on such findings.

That is, the present disclosure provides an all solid state battery comprising a cathode including a cathode active material layer, and a cathode current collector; an anode including an anode active material layer, and an anode current collector; and a solid electrolyte layer placed between the cathode active material layer and the anode active material layer, and the anode active material layer includes an anode active material, and a sulfide solid electrolyte, the anode current collector is a current collector that react with the sulfide solid electrolyte at an open circuit potential of the anode active material, in a thickness direction, the all solid state battery includes an opposing region where the anode active material layer and the cathode active material layer are opposing to each other; and a non-opposing region where the anode active material layer and the cathode active material layer are not opposing to each other, the anode current collector includes a coating layer including a lithium titanate, on a surface of the anode active material layer side, in plan view, the coating layer includes one or two or more of an existence portion and a non-existence portion respectively, in the region specified by an outer edge of the anode current collector, and in plan view, the coating layer includes the existence portion in at least a part of the opposing region, and includes the non-existence portion in at least a part of the non-opposing region.

According to the present disclosure, since the existence portion of the coating layer is placed in the opposing region, and the non-existence portion of the coating layer is placed in the non-opposing region, an all solid state battery wherein the occurrence of a minute short circuit, in an anode active material layer located in a non-opposing region, is suppressed, may be obtained.

In the disclosure, the anode active material may include Si.

In the disclosure, the anode current collector may include Cu or Ni.

In the disclosure, in plan view, the coating layer may include the existence portion in an entire area of the opposing region.

In the disclosure, in plan view, the coating layer may include the existence portion and the non-existence portion in the opposing region.

In the disclosure, in plan view, the coating layer may include the non-existence portion in an entire area of the non-opposing region.

In the disclosure, in plan view, the coating layer may include the existence portion and the non-existence portion in the non-opposing region.

In the disclosure, in plan view, the non-existence portion in the non-opposing region may be placed along a longitudinal direction of the all solid state battery.

In the disclosure, in plan view, the non-existence portion in the non-opposing region may be placed along a transverse direction of the all solid state battery.

In the disclosure, in plan view, the non-existence portion in the non-opposing region may be placed so as to surround the cathode active material layer, continuously or discontinuously.

Effects of Disclosure

The all solid state battery in the present disclosure exhibits effects that the occurrence of a minute short circuit in a non-opposing region may be suppressed.

DESCRIPTION OF EMBODIMENTS

Figure 1A:
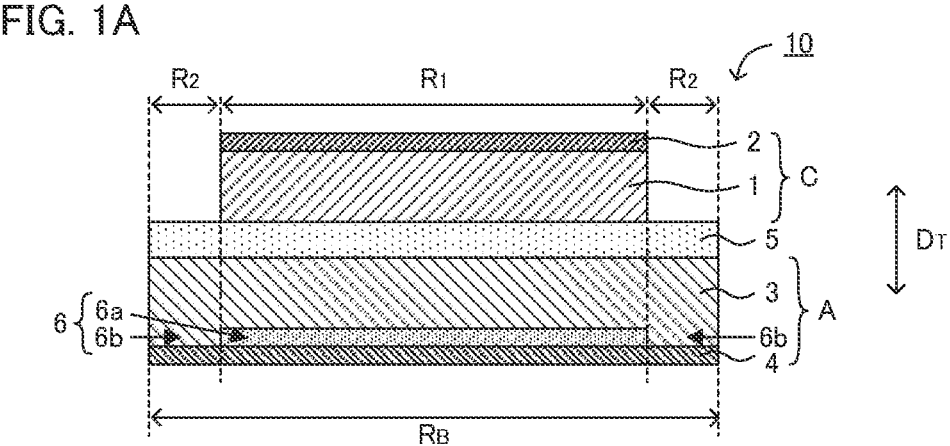
FIG. 1A is a schematic cross-sectional view illustrating an example of an all solid state battery in the present disclosure.

An all solid state battery in the present disclosure will be hereinafter described in detail referring to the drawings. Each figure shown below is schematically expressed, and the size and the shape of each member are appropriately exaggerated, to facilitate understanding. Also, in each figure, the hatching indicating the cross-section of a member is appropriately omitted. Also, in the present specification, in expressing an embodiment of arranging a member on another member, when merely expressed as "on" or "under", it includes both the case of arranging a member directly on or directly under another member so as to be in contact with another member, and the case of arranging a member above or below another member via still another member, unless otherwise specified.

Figure 1B:
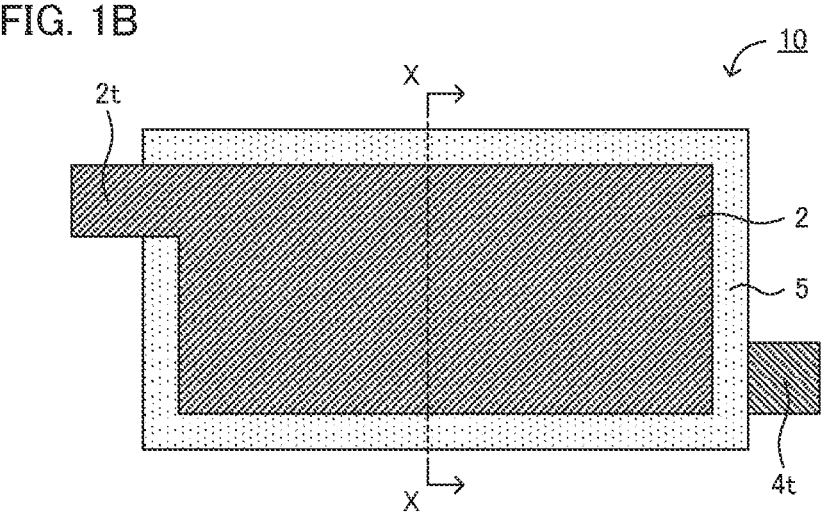
FIG. 1B is a schematic plan view illustrating an example of an all solid state battery in the present disclosure.

FIG. 1A is a schematic cross-sectional view illustrating an example of an all solid state battery in the present disclosure, and corresponds to an X-X cross-sectional view of FIG. 1B. All solid state battery 10 shown in FIGS. 1A and 1B comprises cathode C including cathode active material layer 1, and cathode current collector 2; anode A including anode active material layer 3, and anode current collector 4; and solid electrolyte layer 5 placed between cathode active material layer 1 and anode active material layer 3. Anode active material layer 3 includes an anode active material, and a sulfide solid electrolyte. Also, anode current collector 4 is a current collector that react with the sulfide solid electrolyte at an open circuit potential of the anode active material.

In thickness direction $D_T$, all solid state battery 10 includes opposing region $R_1$ where anode active material layer 3 and cathode active material layer 1 are opposing to each other; and non-opposing region $R_2$ where anode active material layer 3 and cathode active material layer 1 are not opposing to each other. Also, anode current collector 4 includes coating layer 6 including a lithium titanate, on a surface of anode active material layer 3 side. Also, in plan view, coating layer 6 includes existence portion 6a and non-existence portion 6b, in the region $R_B$ specified by an outer edge of anode current collector 4. Further, in plan view, coating layer 6 includes existence portion 6a in at least a part of opposing region $R_1$, and includes non-existence portion 6b in at least a part of non-opposing region $R_2$.

According to the present disclosure, since the existence portion of the coating layer is placed in the opposing region, and the non-existence portion of the coating layer is placed in the non-opposing region, an all solid state battery wherein the occurrence of a minute short circuit, in an anode active material layer located in a non-opposing region, is suppressed, may be obtained. As described above, when the size of the anode is made larger than the size of the cathode, a minute short circuit is likely to occur in the anode active material layer located in the non-opposing region. Thus, by placing the coating layer in the opposing region while not placing the coating layer in the non-opposing region, focusing on the coating layer, the resistance difference between the opposing region and the non-opposing region is decreased, and as the result, a charge reaction may be progressed (the potential of the anode active material may be decreased) in the anode active material layer located in the non-opposing region.

1. Anode

The anode in the present disclosure includes an anode active material layer, a coating layer, and an anode current collector. Also, as shown in FIGS. 1A and 1B, in plan view, anode active material layer 3 is larger than cathode active material layer 1. Particularly, in plan view, anode active material layer 3 is placed so as to include the entire circumference of cathode active material layer 1. The reason therefor is to effectively suppress the short circuit due to the contact of anode active material layer 3 and cathode active material layer 1. Also, in the thickness direction of the all solid state battery, the region where the anode active material layer and the cathode active material layer are opposing to each other is regarded as an opposing region; and the region where the anode active material layer and the cathode active material layer are not opposing to each other is regarded as a non-opposing region.

(1) Anode Active Material Layer

An anode active material layer includes at least an anode active material and a sulfide solid electrolyte. Also, the anode active material layer may further include at least one of a conductive material, and a binder.

The kind of the anode active material is not particularly limited, and examples thereof may include a metal active material, and a carbon active material. Examples of the metal active material may include an active material including a metal such as Si, Sn, Li, In, and Al. The metal active material may be a simple substance of the metal, may be an alloy of the metal, and may be an oxide of the metal. Examples of the metal active material including Si may include a Si simple substance, a Si alloy (such as an alloy including Si as a main component), and a Si oxide. Meanwhile, examples of the carbon active material may include mesocarbon microbeads (MCMB), highly oriented pyrolytic graphite (HOPG), hard carbon, and soft carbon.

The open circuit potential of the anode active material is, for example, 1.5 V (vs. Li/Li$^+$) or more, and may be 2.0 V (vs. Li/Li$^+$) or more. Meanwhile, the open circuit potential of the anode active material may be, for example, 3.2 V (vs. Li/Li$^+$) or less. In particular, the open circuit potential of the anode active material before the initial charge (at the time of battery assembly) may be in the above range. Also, the anode active material may be a material having an expansion rate, at the time of charging, larger than lithium titanate included in the coating layer to be described later.

Examples of the shape of the anode active material may include a granular shape. The average particle size ($D_{50}$) of the anode active material is not particularly limited; and is, for example, 10 nm or more, and may be 100 nm or more. Meanwhile, the average particle size ($D_{50}$) of the anode active material is, for example, 50 μm or less, and may be 20 μm or less. The average particle size ($D_{50}$) may be calculated from the measurement by, for example, a laser diffraction particle size analyzer, and a scanning electron microscope (SEM). The proportion of the anode active material in the anode active material layer is, for example, 20 weight % or more and 80 weight % or less.

Examples of the sulfide solid electrolyte may include a solid electrolyte containing a Li element, an X element (X is at least one kind of P, As, Sb, Si, Ge, Sn, B, Al, Ga, and In), and a S element. Also, the sulfide solid electrolyte may further include at least one of an O element and a halogen element. Examples of the halogen element may include a F element, a Cl element, a Br element, and an I element. The sulfide solid electrolyte may be a glass (amorphous), and may be a glass ceramic. Examples of the sulfide solid electrolyte may include $Li_2S$—$P_2S_5$, $LiI$—$Li_2S$—$P_2S_5$, $LiI$—$LiBr$—$Li_2S$—$P_2S_5$, $Li_2S$—$SiS_2$, $Li_2S$—$GeS_2$, and $Li_2S$—$P_2S_5$—$GeS_2$. Examples of the shape of the sulfide solid electrolyte may include a granular shape.

Examples of the conductive material may include a carbon material, a metal particle, and a conductive polymer. Examples of the carbon material may include particulate carbon materials such as acetylene black (AB) and Ketjen black (KB); and fibrous carbon materials such as carbon fiber, carbon nanotube (CNT), and carbon nanofiber (CNF). Also, examples of the binder may include fluorine-based binders, polyimide-based binders, and rubber-based binders. The thickness of the anode active material layer is, for example, 0.1 μm or more and 1000 μm or less.

(2) Anode Current Collector

The anode current collector is a current collector that react with the sulfide solid electrolyte at an open circuit potential of the anode active material. Examples of the anode current collector may include a metal current collector. Examples of the metal current collector may include a current collector including a metal such as Cu, and Ni. The metal current collector may be a simple substance of the metal, and may be an alloy of the metal. Examples of the shape of the anode current collector may include a foil shape. Also, in plan view, the anode current collector is placed so as to include the entire circumference of the anode active material layer.

(3) Coating Layer

The coating layer is a layer placed on a surface of the anode current collector on the side of the anode active material layer. In plan view, the coating layer includes one or two or more of an existence portion and a non-existence portion respectively, in the region specified by an outer edge of the anode current collector. The number of the existence portions means the number of the existence portions formed continuously in plan view. The same applies to the number of the non-existence portions. For example, when a frame-shaped non-existence portion is placed around a rectangular existence portion, the number of existence portion and the number of non-existence portion are 1, respectively. Also, when the coating layer formed in a whole region specified by the outer edge of the anode current collector (a solid layer) is used as a reference, the non-existence portion may be regarded as a defective portion. In the non-existence portion, the anode active material layer and the anode current collector are usually in direct contact with each other.

The coating layer is a layer including lithium titanate. The lithium titanate is a compound including Li, Ti, and O. Examples thereof may include $Li_4Ti_5O_{12}$, $Li_4TiO_4$, $Li_2TiO_3$, and $Li_2Ti_3O_7$. Also, lithium titanate included in the coating layer may be doped with Li. The proportion of lithium titanate in the coating layer is, for example, 50 weight % or more, and may be 70 weight % or more, and may be 90 weight % or more.

The coating layer may further include a binder. By adding a binder, adhesiveness of the coating layer is improved, and adhesion of the anode active material layer and the anode current collector is improved. Also, the coating layer may or may not include a sulfide solid electrolyte. Since the sulfide solid electrolyte and the binder are the same as those described above, description thereof is omitted here.

The thickness of the coating layer is not particularly limited, and is, for example, 1 μm or more, and may be 2 μm or more. If the thickness of the coating layer is too thin, there is a possibility that a sufficient shutdown function may not be exhibited. Meanwhile, the thickness of the coating layer is, for example, 15 μm or less, and may be 10 μm or less. If the thickness of the coating layer is too thick, the thickness of the anode active material layer will be relatively small, and the volume energy density may be decreased.

In some embodiments, the thickness of the coating layer is smaller than the thickness of the anode active material layer. The reason therefor is to suppress the decrease in the volume energy density. The thickness of the coating layer with respect to the thickness of the anode active material layer is, for example, 3% or more, and may be 5% or more. Meanwhile, the thickness of the coating layer with respect to the thickness of the anode active material layer is, for example, 20% or less, and may be 13% or less. The method for forming the coating layer is not particularly limited, and examples thereof may include a method wherein a slurry is produced by dispersing lithium titanate in a dispersion medium, coating an anode current collector with the slurry, and drying the slurry.

Figure 2A:
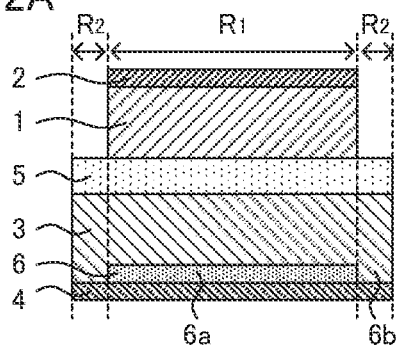
FIG. 2A is a schematic cross-sectional view illustrating an example of an all solid state battery in the present disclosure.

Also, the coating layer in the present disclosure includes, in plan view, the existence portion in at least a part of the opposing region, and includes the non-existence portion in at least a part of the non-opposing region. For example, as shown in FIG. 2A, coating layer 6 may include existence portion 6a in the entire area of opposing region $R_1$. By providing existence portion 6a in the entire area of opposing region $R_1$, the shutdown function may be effectively exhibited. Also, coating layer 6 in FIG. 2A includes non-existence portion 6b in the entire area of non-opposing region $R_2$. By providing non-existence portion 6b in the entire area of non-opposing region $R_2$, the resistance difference between the opposing region and the non-opposing region may be reduced, and the uniformity of charge/discharge reaction in the anode active material layer may be further improved.

Figure 2D:
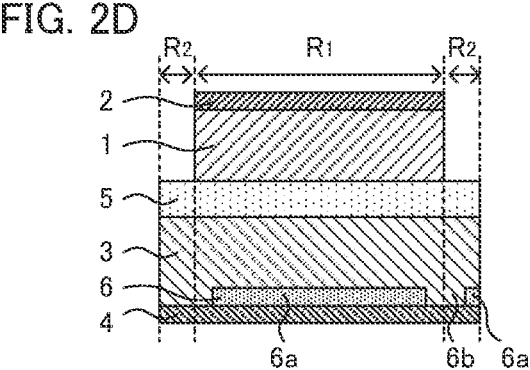
FIG. 2D is a schematic cross-sectional view illustrating another example of an all solid state battery in the present disclosure.
Figure 2B:
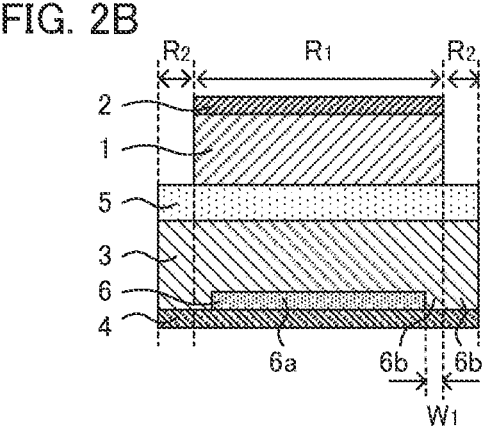
FIG. 2B is a schematic cross-sectional view illustrating another example of an all solid state battery in the present disclosure.

Also, as shown in FIG. 2B, coating layer 6 may include both of existence portion 6a and non-existence portion 6b in opposing region $R_1$. By providing non-existence portion 6b in opposing region $R_1$, the resistance difference between the opposing region and the non-opposing region may further be decreased. In a cross-sectional view, when the width between the end portion of existence portion 6a located at the outermost in opposing region $R_1$, and the end portion of cathode active material layer 1 is regarded as $W_1$, $W_1$ is not particularly limited, and is, for example, 0.1 mm or more and 20 mm or less. Also, in opposing region $R_1$, the proportion of the area of existence portion 6a to the total area of existence portion 6a and non-existence portion 6b is, for example, 70% or more, may be 80% or more, and may be 90% or more. Also, as shown in FIG. 2B, non-existence portion 6b in opposing region $R_1$ and non-existence portion 6b in non-opposing region $R_2$ may be continuously formed. Also, as shown in FIG. 2C, coating layer 6 may include two or more existence portions 6a in opposing region $R_1$. Similarly, coating layer 6 may include two or more non-existence portions 6b in opposing region $R_1$.

Also, as shown in FIG. 2D, coating layer 6 may include both of existence portion 6a and non-existence portion 6b in non-opposing region $R_O$. Further, as shown in FIG. 2D, the end portion of existence portion 6a in non-opposing region $R_2$ may coincide with the end portion of anode active material layer 3. Since the volume variation due to charge/discharge of the lithium titanate included in existence portion 6a (coating layer 6) is small, the damage of an exterior body may be suppressed by placing such existence portion 6a at the outermost side.

Figure 2E:
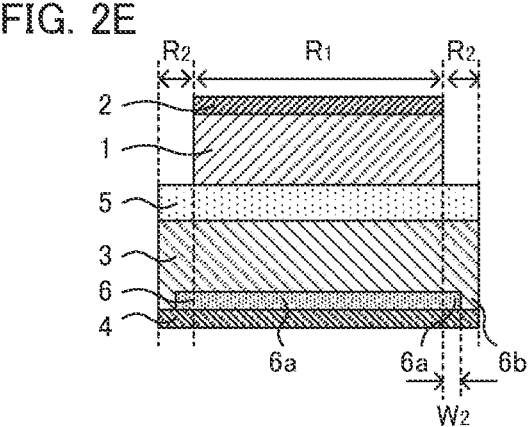
FIG. 2E is a schematic cross-sectional view illustrating another example of an all solid state battery in the present disclosure.
Figure 2C:
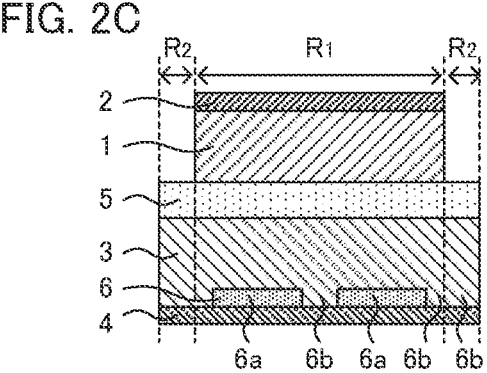
FIG. 2C is a schematic cross-sectional view illustrating another example of an all solid state battery in the present disclosure.
Figure 2F:
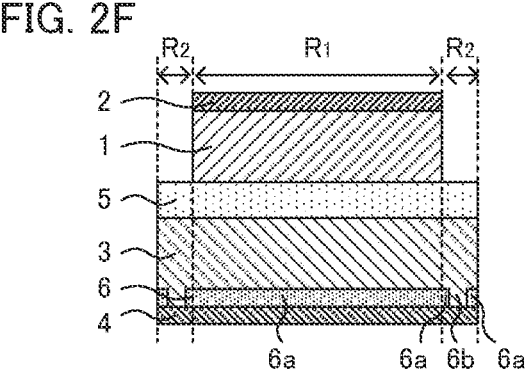
FIG. 2F is a schematic cross-sectional view illustrating another example of an all solid state battery in the present disclosure.

Also, as shown in FIG. 2E, existence portion 6a in opposing region $R_1$ and existence portion 6a in non-opposing region $R_2$ may be continuously formed. Thereby a cracking at the end portion of existence portion 6a due to the confining pressure may be suppressed. In a cross-sectional view, when the width between the end portion of existence portion 6a located so as to extend from opposing region $R_1$ to non-opposing region $R_2$, and the end portion of cathode active material layer 1 is regarded as $W_2$, $W_2$ is not particularly limited, and is, for example, 0.1 mm or more and 10 mm or less. Also, in non-opposing region $R_2$, the proportion of the area of non-existence portion 6b to the total area of non-existence portion 6b and existence portion 6a is, for example, 70% or more, may be 80% or more, and may be 90% or more. Also, as shown in FIG. 2F, the end portion of existence portion 6a in non-opposing region $R_2$ may coincide with the end portion of anode active material layer 3. Also, as shown in FIG. 2F, coating layer 6 may include two or more existence portions 6a in non-opposing region $R_2$. Incidentally, although not particularly shown in the figure, the coating layer may include two or more non-existence portions in the non-opposing region.

Figure 3A:
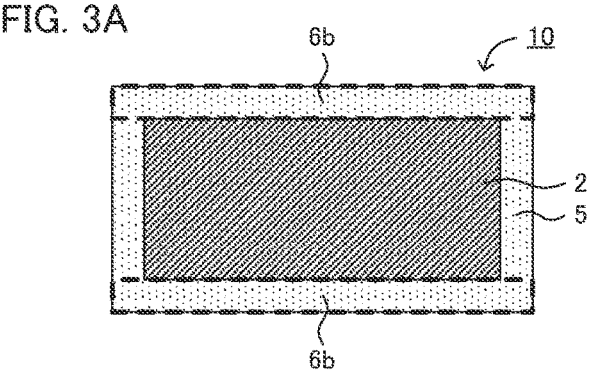
FIG. 3A is a schematic plan view illustrating an example of an all solid state battery in the present disclosure.
Figure 3C:
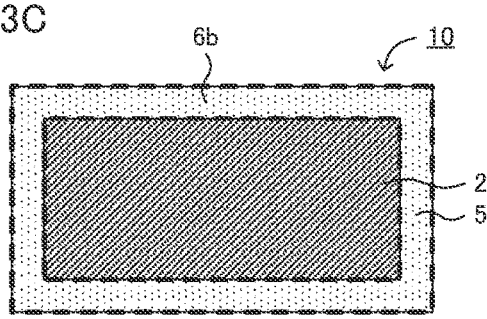
FIG. 3C is a schematic plan view illustrating another example of an all solid state battery in the present disclosure.
Figure 3B:
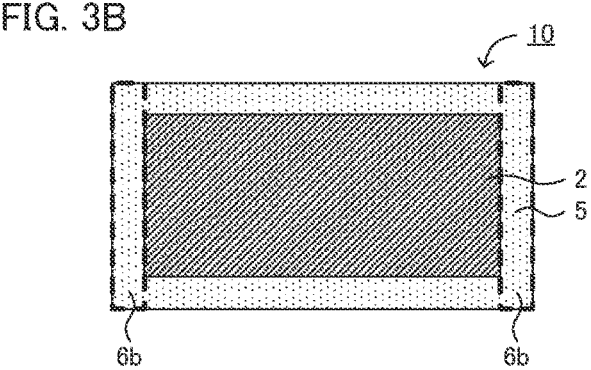
FIG. 3B is a schematic plan view illustrating another example of an all solid state battery in the present disclosure.
Figure 3D:
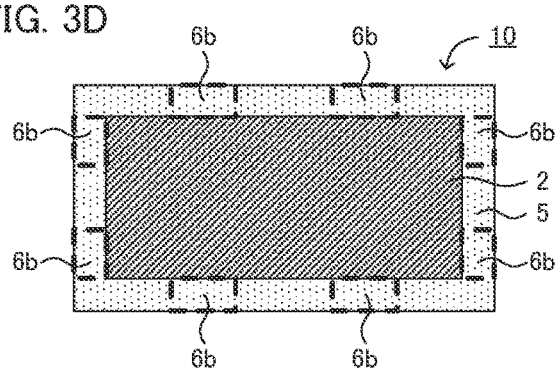
FIG. 3D is a schematic plan view illustrating another example of an all solid state battery in the present disclosure.

Also, as shown in FIG. 3A, non-existence portion 6b in non-opposing region may be placed along the longitudinal direction of the all solid state battery in plan view. In this case, two non-existence portions 6b are placed so as to face each other. However, non-existence portion 6b may be placed on either side. Also, as shown in FIG. 3B, non-existence portion 6b in the non-opposing region may be placed along the transverse direction of the all solid state battery in plan view. Also in this case, although two non-existence portions 6b are placed so as to face each other, non-existence portion 6b may be placed on either side. Also, as shown in FIG. 3C, non-existence portion 6b in the non-opposing region may be placed so as to surround the cathode active material layer (not shown in the figure), continuously in plan view. Similarly, as shown in FIG. 3D, non-existence portion 6b in the non-opposing region may be placed so as to surround the cathode active material layer (not shown in the figure), discontinuously (intermittently) in plan view.

2. Cathode

The cathode in the present disclosure includes a cathode active material layer, and a cathode current collector. The cathode active material layer is a layer including at least a cathode active material. Also, the cathode active material layer may include at least one of a sulfide solid electrolyte, a conductive material, and a binder, as necessary.

Examples of the cathode active material may include an oxide active material. Examples of the oxide active material may include rock salt bed type active materials such as $LiCoO_2$, $LiMnO_2$, $LiNiO_2$, $LiVO_2$, $LiN_{1/3}Co_{1/3}Mn_{1/3}O_2$; spinel type active materials such as $LiMn_2O_4$, $Li_4Ti_5O_{12}$, and $Li(Ni_{0.5}Mn_{1.5})O_4$; and olivine type active materials such as $LiFePO_4$, $LiMnPO_4$, $LiNiPO_4$, and $LiCoPO_4$.

A protecting layer including a Li ion conductive oxide may be formed on the surface of the oxide active material. The reason therefor is to suppress the reaction between the oxide active material and the sulfide solid electrolyte. Examples of the Li ion conductive oxide may include $LiNbO_3$. The thickness of the protecting layer is, for example, 1 nm or more and 30 nm or less. Also, $Li_2S$ may be used, for example, as the cathode active material.

Examples of the shape of the cathode active material may include a granular shape. The average particle size ($D_{50}$) of the cathode active material is not particularly limited; and is, for example, 10 nm or more, and may be 100 nm or more. Meanwhile, the average particle size ($D_{50}$) of the cathode active material is, for example, 50 μm or less, and may be 20 μm or less.

The sulfide solid electrolyte, the conductive material and the binder used for the cathode active material layer may be in the same contents as those described in "1. Anode" above; thus, the description herein is omitted. The thickness of the cathode active material layer is, for example, 0.1 μm or more and 1000 μm or less. Also, examples of the materials for the cathode current collector may include SUS, aluminum, nickel, iron, titanium, and carbon.

3. Solid Electrolyte Layer

The solid electrolyte layer in the present disclosure is a layer placed between the cathode active material layer and the anode active material layer, and is a layer including at least a solid electrolyte. In some embodiments, the solid electrolyte layer includes a sulfide solid electrolyte as the solid electrolyte. Also, the solid electrolyte layer may include a binder. The sulfide solid electrolyte, and the binder used for the solid electrolyte layer may be in the same contents as those described in "1. Anode" above; thus, the description herein is omitted. The thickness of the solid electrolyte layer is, for example, 0.1 μm or more and 1000 μm or less.

4. All Solid State Battery

The all solid state battery in the present disclosure includes at least one power generation unit including a cathode active material layer, a solid electrolyte layer, and an anode active material layer, and may include two or more of them. When the all solid state battery includes a plurality of the power generation units, they may be connected in parallel, and may be connected in series.

Figure 4:
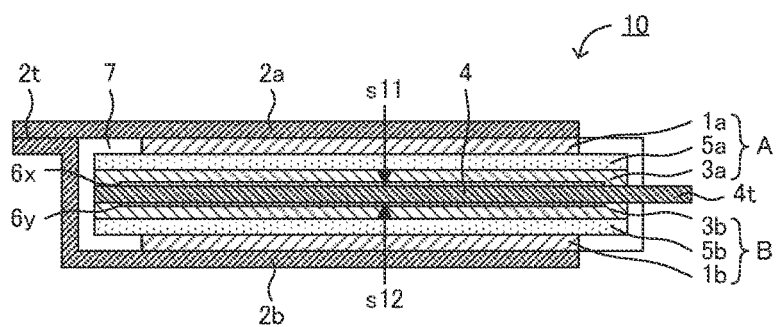
FIG. 4 is a schematic cross-sectional view illustrating an example of an all solid state battery in the present disclosure.

All solid state battery 10 shown in FIG. 4 includes power generation unit A and power generation unit B, and these are connected in parallel. Specifically, in all solid state battery 10, based on anode current collector 4, first coating layer 6x, first anode active material layer 3a, first solid electrolyte layer 5a, first cathode active material layer 1a, and first cathode current collector 2a are placed in this order, on one surface s11; and second coating layer 6y, second anode active material layer 3b, second solid electrolyte layer 5b, second cathode active material layer 1b, and second cathode current collector 2b are placed in this order, on the other surface s12. Further, all solid state battery 10 includes cathode tab 2t to which first cathode current collector 2a and second cathode current collector 2b are connected; and anode tab 4t located at an end of anode current collector 4. Also, the insulating layer 7 is placed on the side surface of power generation unit A and power generation unit B. Such all solid state battery 10 has an advantage that the stress due to the difference in the stretching ability of the cathode layer and the anode layer is less likely to occur, since the configuration of the other layers is symmetrical with respect to anode current collector 4.

The all solid state battery in the present disclosure is provided with an exterior body that houses a cathode, a solid electrolyte layer, and an anode. The kind of the exterior body is not particularly limited; and examples thereof may include a laminate exterior body.

The all solid state battery in the present disclosure may include a confining jig that applies a confining pressure along the thickness direction, to the cathode, the solid electrolyte layer and the anode. By applying the confining pressure, a favorable ion conductive path and an electron conductive path may be formed. The confining pressure is, for example, 0.1 MPa or more, may be 1 MPa or more, and may be 5 MPa or more. Meanwhile, the confining pressure is, for example, 100 MPa or less, may be 50 MPa or less, and may be 20 MPa or less.

The all solid state battery in the present disclosure is typically an all solid state lithium ion secondary battery. The use of all solid state battery is not particularly limited, and examples thereof may include a power supply of a vehicle such as a hybrid electric vehicle, a battery electric vehicle, a gasoline-powered vehicle, and a diesel-powered vehicle. In particular, it is used in the driving power supply of a hybrid electric vehicle, or a battery electric vehicle. Also, the all solid state battery in the present disclosure may be used as a power source for moving objects other than vehicles, such as railroad vehicles, ships, and airplanes, or may be used as a power source for electric appliances such as information processing apparatuses.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

Comparative Example 1

<Production of Anode>

Firstly, a slurry including the followings were prepared: a lithium titanate ($Li_4Ti_5O_{12}$ particles, average particle size of 0.7 μm), a sulfide solid electrolyte (10LiI-15LiBr-75 (0.75$Li_2S$-0.25$P_2S_5$)), a binder (styrene-butadiene rubber, SBR) and a dispersing medium. A coating layer (thickness of 5 μm) was formed by coating an anode current collector (a Ni foil, thickness of 15 μm) with this slurry, and drying.

Next, an anode slurry including the followings were prepared: an anode active material (Si particles, average particle size of 2.5 μm), a sulfide solid electrolyte (10LiI-15LiBr-75(0.75$Li_2S$-0.25$P_2S_5$)), a conductive material (VGCF), a binder (SBR) and a dispersing medium. An anode active material layer (thickness of 50 μm) was formed by coating the coating layer with the obtained anode slurry, and drying. Thereby, an anode including an anode current collector, a coating layer, and an anode active material layer was obtained.

<Production of Cathode>

A cathode slurry including the followings were prepared: a cathode active material ($LiNi_{1/3}Co_{1/3}Mn_{1/3}O_2$ coated with $LiNbO_3$), a sulfide solid electrolyte (10LiI-15LiBr-75 (0.75$Li_2S$-0.25$P_2S_5$)), a conductive material (VGCF), a binder (PVDF) and a dispersing medium. A cathode active material layer (thickness of 60 μm) was formed by coating a cathode current collector (an Al foil, thickness of 15 μm) with the obtained cathode slurry, and drying. Thereby, a cathode including a cathode current collector, and a cathode active material layer was obtained.

<Production of Solid Electrolyte Layer>

A solid electrolyte layer (thickness of 30 μm) was obtained by charging a sulfide solid electrolyte (10LiI-15LiBr-75(0.75Li$_2$S-0.25P$_2$S$_5$)) into a ceramic tube with an inner cross-sectional area of 1 cm$^2$, and pressing under 4 ton/cm$^2$.

<Production of Evaluation Cell>

Figure 5A:
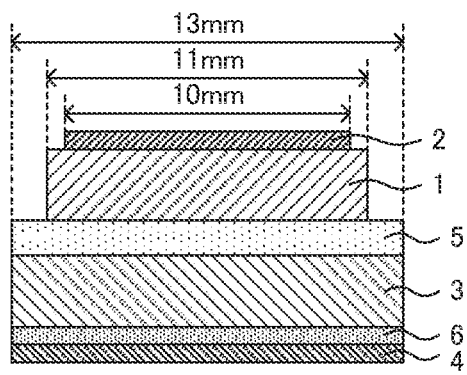
FIG. 5A is a schematic cross-sectional view illustrating an evaluation battery in Comparative Example 1.

An evaluation cell was obtained by placing the cathode on one surface of the solid electrolyte layer, placing the anode on another surface of the solid electrolyte layer, and pressing. As shown in FIG. 5A, in the obtained evaluation cell, the width of anode current collector 4, coating layer 6, anode active material layer 3, and solid electrolyte layer 5 was 13 mm respectively, the width of cathode active material layer 1 was 11 mm, and the width of cathode current collector 2 was 10 mm.

Example 1

Figure 5B:
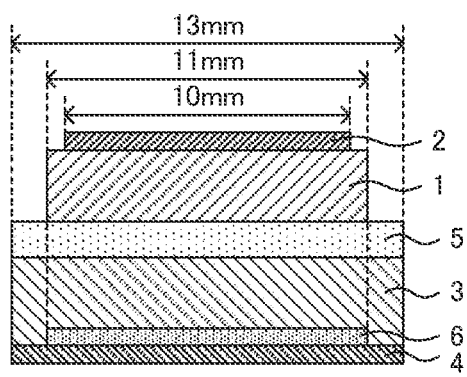
FIG. 5B is a schematic cross-sectional view illustrating an evaluation battery in Example 1.

An evaluation cell was obtained in the same manner as in Comparative Example 1 except that the width of coating layer 6 was changed to 11 mm, as shown in FIG. 5B.

Example 2

Figure 5C:
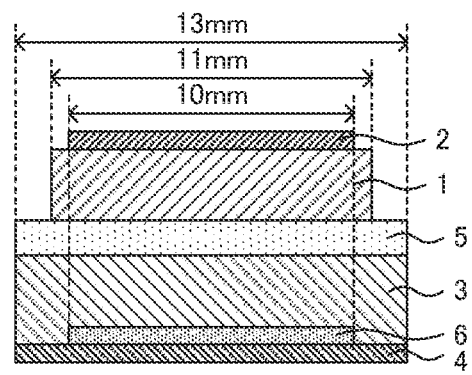
FIG. 5C is a schematic cross-sectional view illustrating an evaluation battery in Example 2.

An evaluation cell was obtained in the same manner as in Comparative Example 1 except that the width of coating layer 6 was changed to 10 mm, as shown in FIG. 5C.

Example 3

Figure 5D:
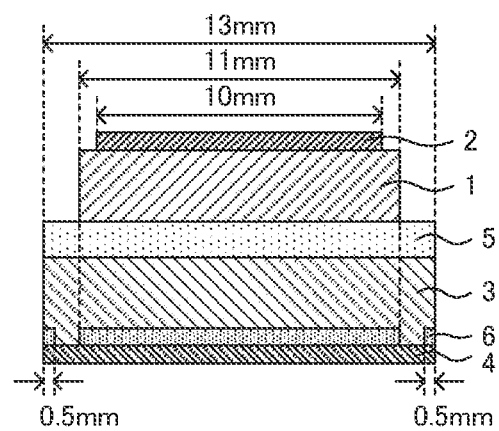
FIG. 5D is a schematic cross-sectional view illustrating an evaluation battery in Example 3.

An evaluation cell was obtained in the same manner as in Comparative Example 1 except that the shape in plan view of coating layer 6 was changed, as shown in FIG. 5D.

[Evaluation]

The valuation cells obtained in Examples 1 to 3 and Comparative Example 1 was CCCV charged, at 0.1 C until 3.0 V, and the charge was stopped at the time when the current value reached 0.01 C. Then, the evaluation cells were stored at 60° C. for 30 days, and the voltage decrease before and after the storage was determined. The results are shown in Table 1.

TABLE 1

| | Voltage decrease (ΔV) |
|---|---|
| Comp. Ex. 1 | 0.505 V |
| Example 1 | 0.005 V |
| Example 2 | 0.003 V |
| Example 3 | 0.005 V |

As shown in Table 1, it was confirmed that, compared to Comparative Example 1, the voltage decrease in Examples 1 to 3 was remarkably low. The reason therefor is presumed that, by placing the coating layer in the opposing region while not placing the coating layer in the non-opposing region, the resistance difference between the opposing region and the non-opposing region was decreased, so that the charging was progressed also in the non-opposing region, so as to decrease the potential of the non-opposing region.

REFERENCE SIGNS LIST

1 . . . cathode active material layer
2 . . . cathode current collector
3 . . . anode active material layer
4 . . . anode current collector
5 . . . solid electrolyte layer
10 . . . all solid state battery

What is claimed is:

1. An all solid state battery comprising a cathode including a cathode active material layer, and a cathode current collector; an anode including an anode active material layer, and an anode current collector; and a solid electrolyte layer placed between the cathode active material layer and the anode active material layer, and
   the anode active material layer includes an anode active material, and a sulfide solid electrolyte,
   the anode current collector is a current collector that reacts with the sulfide solid electrolyte at an open circuit potential of the anode active material,
   in a thickness direction, the all solid state battery includes an opposing region where the anode active material layer and the cathode active material layer are opposing to each other; and a non-opposing region where the anode active material layer and the cathode active material layer are not opposing to each other,
   the anode current collector includes a coating layer including a lithium titanate, on a surface of the anode active material layer side,
   the anode active material layer and the anode current collector are in direct contact in the non-existence portion,
   in plan view, the coating layer includes one or two or more of an existence portion and a non-existence portion respectively, in the region specified by an outer edge of the anode current collector, and
   in plan view, the coating layer includes the existence portion and the non-existence portion in the opposing region, and includes the non-existence portion in at least a part of the non-opposing region.

2. The all solid state battery according to claim 1, wherein the anode active material includes Si.

3. The all solid state battery according to claim 1, wherein the anode current collector includes Cu or Ni.

4. The all solid state battery according to claim 1, wherein, in plan view, the coating layer includes the non-existence portion in an entire area of the non-opposing region.

5. The all solid state battery according to claim 1, wherein, in plan view, the coating layer includes the existence portion and the non-existence portion in the non-opposing region.

6. The all solid state battery according to claim 1, wherein, in plan view, the non-existence portion in the non-opposing region is provided along a longitudinal direction of the all solid state battery.

7. The all solid state battery according to claim 1, wherein, in plan view, the non-existence portion in the non-opposing region is provided along a transverse direction of the all solid state battery.

8. The all solid state battery according to claim 1, wherein, in plan view, the non-existence portion in the non-opposing region is provided so as to surround the cathode active material layer, continuously or discontinuously.

9. An all solid state battery comprising a cathode including a cathode active material layer, and a cathode current collector; an anode including an anode active material layer, and an anode current collector; and a solid electrolyte layer placed between the cathode active material layer and the anode active material layer, and
   the anode active material layer includes an anode active material, and a sulfide solid electrolyte, the anode current collector is a current collector that reacts with the sulfide solid electrolyte at an open circuit potential of the anode active material, in a thickness direction, the all solid state battery includes an opposing region where the anode active material layer and the cathode active material layer are opposing to each other; and a non-opposing region where the anode active material layer and the cathode active material layer are not opposing to each other, the anode current collector includes a coating layer including a lithium titanate, on a surface of the anode active material layer side, the anode active material layer and the anode current collector are in direct contact in the non-existence portion, in plan view, the coating layer includes one or two or more of an existence portion and a non-existence portion respectively, in the region specified by an outer edge of the anode current collector, and in plan view, the coating layer includes the existence portion in at least a part of the opposing region, and includes the existence portion and the non-existence portion in the non-opposing region.

10. The all solid state battery according to claim 9, wherein the anode active material includes Si.

11. The all solid state battery according to claim 9, wherein the anode current collector includes Cu or Ni.

12. The all solid state battery according to claim 9, wherein, in plan view, the coating layer includes the existence portion in an entire area of the opposing region.

13. The all solid state battery according to claim 9, wherein, in plan view, the non-existence portion in the non-opposing region is provided along a longitudinal direction of the all solid state battery.

14. The all solid state battery according to claim 9, wherein, in plan view, the non-existence portion in the non-opposing region is provided along a transverse direction of the all solid state battery.

15. The all solid state battery according to claim 9, wherein, in plan view, the non-existence portion in the non-opposing region is provided so as to surround the cathode active material layer, continuously or discontinuously.

* * * * *